United States Patent [19]

Kandlur et al.

[11] Patent Number: 5,521,601
[45] Date of Patent: May 28, 1996

[54] POWER-EFFICIENT TECHNIQUE FOR MULTIPLE TAG DISCRIMINATION

[75] Inventors: Dilip D. Kandlur; Arvind Krishna, both of Briarcliff Manor, N.Y.

[73] Assignee: International Business Machines Corporation, Armonk, N.Y.

[21] Appl. No.: 426,507

[22] Filed: Apr. 21, 1995

[51] Int. Cl.$^6$ ................................................. G01S 13/76
[52] U.S. Cl. .............................................. 342/44; 342/51
[58] Field of Search .................................... 342/42, 44, 51

[56] References Cited

U.S. PATENT DOCUMENTS

| | | | |
|---|---|---|---|
| 4,885,571 | 12/1989 | Pauley et al. | 340/573 |
| 5,231,273 | 7/1993 | Caswell et al. | 340/825.44 X |
| 5,406,275 | 4/1995 | Hassett et al. | 340/933 |
| 5,448,242 | 9/1995 | Sharpe et al. | 342/42 |
| 5,450,087 | 9/1995 | Hurta et al. | 342/42 |
| 5,471,212 | 11/1995 | Sharpe et al. | 342/51 |

*Primary Examiner*—John B. Sotomayor
*Attorney, Agent, or Firm*—Douglas W. Cameron

[57] ABSTRACT

This invention provides a tag identification system and method for identifying tags in the range of a reader station where the tags are divided into smaller groups, where the tags are identified one group at a time so as to save power by powering off the tags that are not in the group currently being identified. Each tag puts itself in a group by performing calculations from parameters stored in itself and from parameters received from the reader station. In another variation of this invention, only tags which configure themselves to be activated at a final frequency are identified. The set of tags which configure themselves to be activated at the final frequency changes with each identification round until all tags in the range of the reader have been identified.

8 Claims, 10 Drawing Sheets

POWER-EFFICIENT TECHNIQUE FOR MULTIPLE TAG DISCRIMINATION

TECHNICAL FIELD

The present invention relates to the identification of radio-frequency (hereinafter, RF) tags placed in the vicinity of a RF reader station. More specifically, the invention relates to the field of identifying and exchanging information between the reader station and a plurality of RF tags that can transmit simultaneously.

DESCRIPTION OF THE PRIOR ART

In an RF item identification (hereinafter, RFID) system, identification tags are placed on items of interest. The tag contains information about the item to which it is attached, such as its identity, price, date on shelf, and so on (much like a bar code). Each tag carries an electronic circuit for receiving radio signals and digital control circuitry. The reception of an appropriate radio signal triggers the tag to power on its circuitry and respond to further messages received over radio signals. The tag consists of a semiconductor chip having RF circuits, logic, and memory. The tag also has an antenna, often a collection of discrete components, capacitors and diodes, for example, a battery in the case of active tags, a substrate for mounting the components, interconnections between components, and a means of physical enclosure. In general, RF tags are manufactured by mounting the individual elements to a circuit card. See reference [1], which is hereby incorporated herein by reference.

The tags are powered by an on-board battery, which is typically formed of appropriate polymer technology with just a few layers of foil put together like a sandwich. This battery is consumed primarily when the tag is active, as in the case when the tag interacts with the reader station.

The tag reader initiates the reading process to identify the various tags placed in the vicinity of the reader station. There is an RF communication channel, consisting of a forward channel and a reverse channel, between the tag readers and the tags. Transmissions from the base station (the forward channel) do not need scheduling, since the tag reader is the only station to transmit on this channel. The tags transmit messages only in response to queries from the tag reader, and they do so on the reverse channel. It is necessary to provide an arbitration mechanism for the reverse channel since all the tags can potentially transmit in this channel. The tag reader sends a feedback message (on the forward channel) to the tags at the end of each transmission on the reverse channel. This message indicates whether the previous transmission was received correctly, and if so, the identity of the sending tag.

In prior art methods have been presented that seek to minimize the length of the reading process. See again reference [1], which teaches a method of minimizing the length of the reading process. However, these method do not directly address the problem of limiting the time that any particular tag is active. It is of paramount importance to conserve the usage of this battery, since it is the prime determinant of the useful life of a tag.

SUMMARY OF THE INVENTION

It is an objective of this invention to conserve the battery charge and extend the useful life of the RF tag.

This invention provides tag identification methods for the reading station and the RF tag. These methods satisfy the constraints of the RF tag, and they can be implemented in the limited environment of the tag. These methods (1) minimize the active time of an RF tag when there is only one signal used to activate the tags, and (2) further minimize the active time of an RF tag when there is a multiplicity of signals to activate the tags. Thus, this invention provides two sets of solutions applicable to tags of different capabilities.

Accordingly, this invention provides for the identification of tags in the vicinity of reader station so that the RF tags have a minimum active time. With this invention, a reader station broadcasts a first signal (wake-up) and a first indication (first estimate) of the number of tags in the range of the reader. Upon receiving the wake-up signal, the tags will wake-up (become activated). The activated tags will then use the estimate and other parameters to perform a corresponding computation. Each tag will then deactivate itself if its corresponding computation yields a predetermined result. The tags which remain activated will then be identified using conventional methods, and the identified tags will store an indication (identified indication) to indicate that it has been identified by the reader. This process will then be repeated using subsequent estimates of the tags needed to be identified and further computations by the unidentified tags until all the tags have been identified.

In other variations of this invention, tags will perform computations to group themselves into sets of tags responsive to selected frequencies or round numbers. The tags grouped into a set of tags that respond to a specific frequency or round number will then be identified using conventional tag identification procedures. It is this grouping of the tags which minimizes the time the tags must remain activated when they are being identified.

In yet another variation of the tag identification process of this invention, a selected group of tags is configured to be activated on a final frequency, and then each tag in the selected group is identified and reconfigured again to respond to a first frequency. Subsequently another group of tags is configured to be activated at the final frequency where each tag in the selected group is identified at the final frequency and then reconfigured to respond to the first frequency. This latter identification process repeats itself with other selected groups of tags until all tags have been identified and configured to respond to the first frequency. These, and other objects, features and advantages of this invention will become apparent from the following detailed description of the invention taken in conjunction with the accompanying drawings.

DESCRIPTION OF THE PREFERRED EMBODIMENT

This invention provides tag identification methods for the reading station and the RF tags placed in the vicinity of the reader station. These methods satisfy the constraints of the RF tag, and they can be implemented in the limited environment of the tag. These methods (1) minimize the active time of an RF tag when there is only one signal used for activate the tags. (2) further minimize the active time of an RF tag when there is a multiplicity of signals to activate the tags. Thus, this invention provides two sets of solutions applicable to tags of different capabilities.

Figure 1:
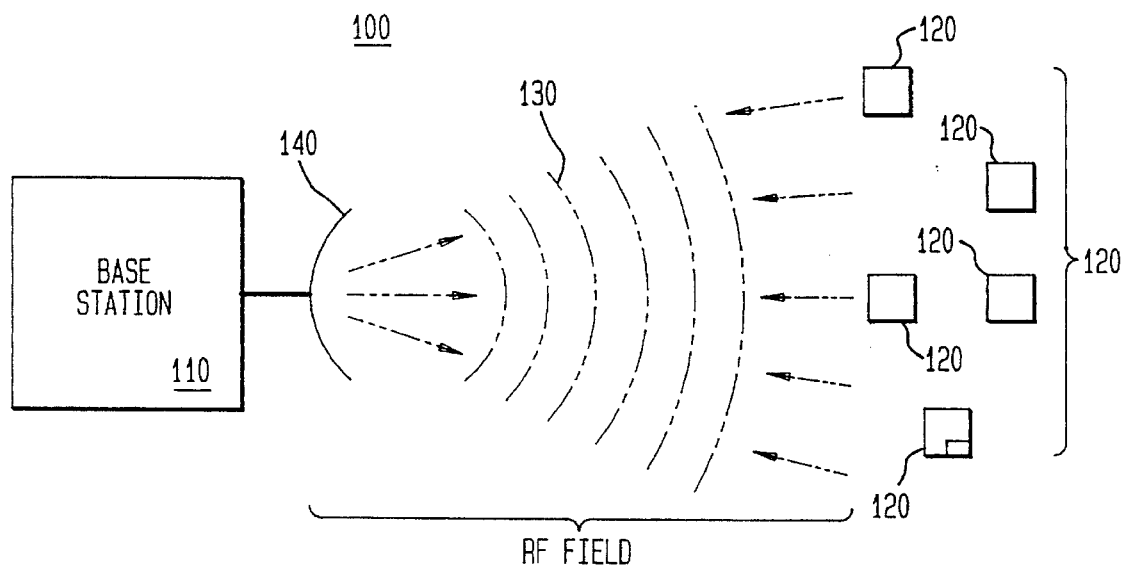
FIG. 1 shows an RF reader station with several RF-tagged items in its

FIG. 1 illustrates an example RF tag identification system (100), with RF tags (120) placed in the vicinity of the reader station (110). The reader station can transmit RF signals (130) through the antenna (140) to the RF tags.

Figure 2:
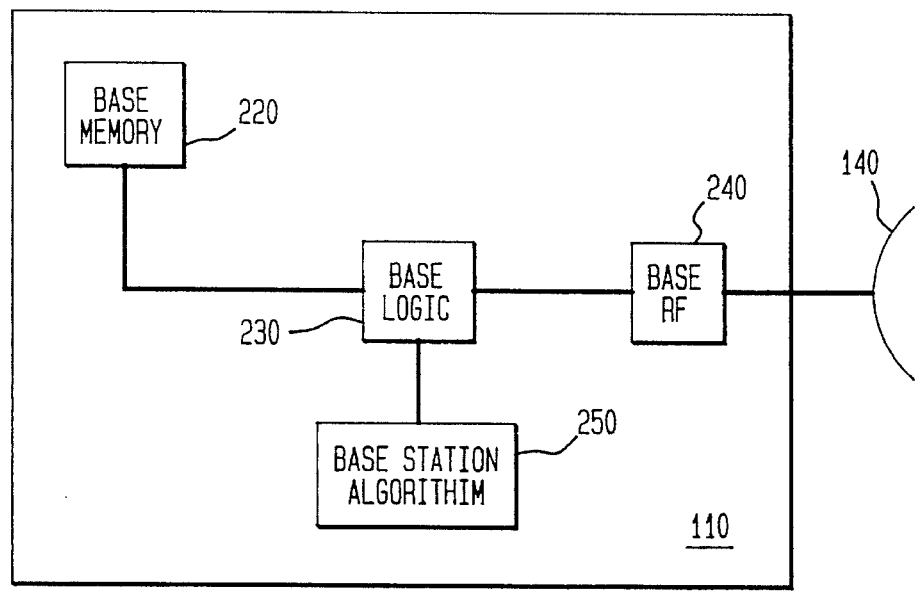
FIG. 2 shows a structure for the RF reader station.

FIG. 2 shows a structure for the reader station (110). The reader station design includes a base memory (220). The base memory is used to store programs, application data, and identification information of the RF tags. The reader station logic (230) executes the programs used for tag identification as described below. The base RF logic (240) and the base RF front-end (240) are used to generate RF signals to communicate with the RF tags, are well-known in the art and are also described in reference [1]. Base station algorithm 250 is described below in the descriptions of FIGS. 4, 6, 8, and 10.

Figure 3:
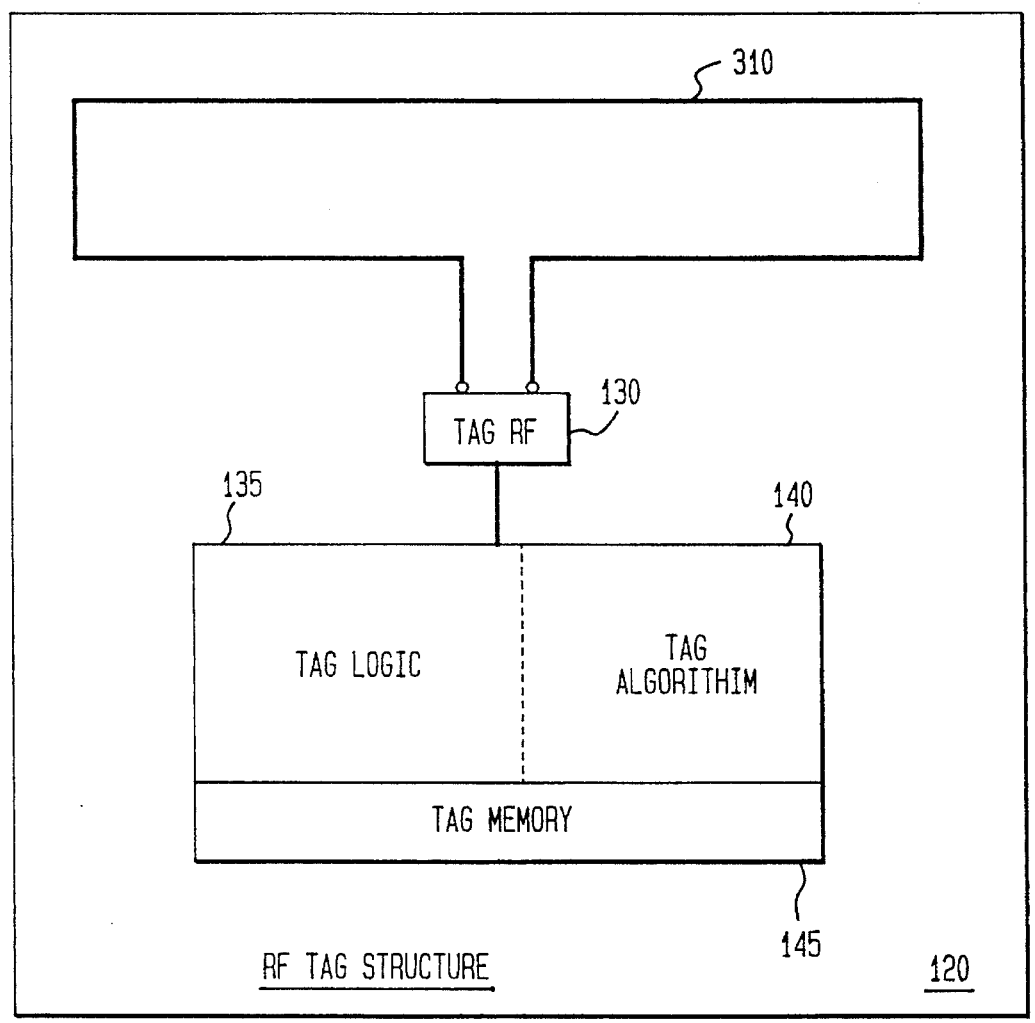
FIG. 3 shows a structure for the RF tag.

FIG. 3 shows a possible structure for the RF tags (120). Each RF tag contains a tag antenna (310) which is used to receive and transmit an RF signal. The tag antenna connects to the tag system which includes a tag RF front end 130, tag logic 135, tag algorithms 140, and tag memory 145 (See [1]).

Figure 4:
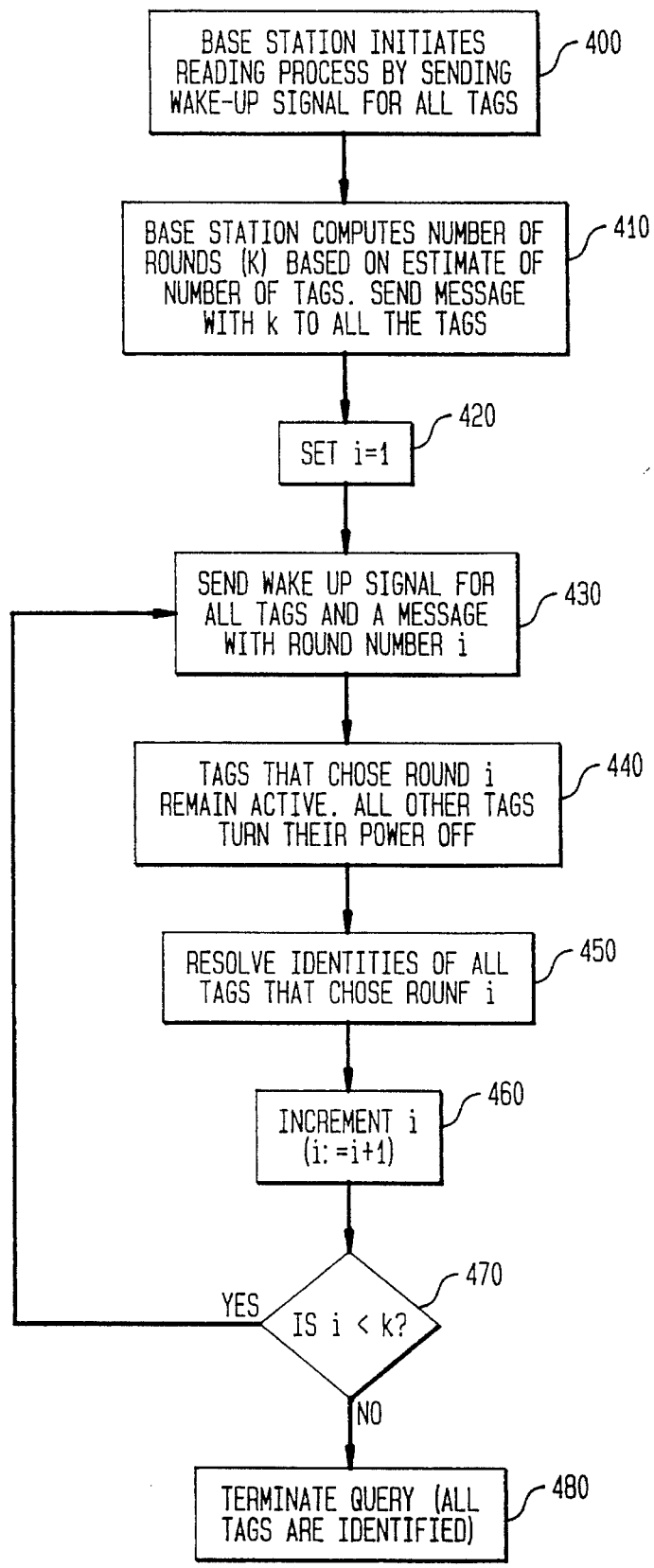
FIG. 4 is a block diagram for the single frequency procedure of RF tag identification used by the RF reader station.

FIG. 4 is a block diagram for the single frequency procedure of RF tag identification used by the RF reader station. The reader station initiates the identification process (400) by sending a wake-up signal to all the tags in its range. This wake-up signal may be in the form of a short pulse of high intensity on a predetermined frequency. The reader station computes the number of rounds, k, in the reading process (410) based on an estimate of the number of tags present in its range (listening area). This estimate may be provided by an external source (such as the human operator of the system) or it may be derived using a technique such as the one presented in [2]. The number of rounds, k, is selected with the goal of ensuring a small number of tags in each round. Let a unit of power be consumed at the tag for a unit of time, the unit of time being the time that it takes for the reader station to send a message or the time it takes for the tag to send a message containing its identity. For example, k can be computed as a function of two known quantities (i) the estimated number of tags, n, and (ii) the minimum power consumption, p, if a tag is activated and it chooses to deactivate itself. Then, k can be defined as follows: $k=\sqrt{n/p}$.

The reader station sends a message containing k to all the tags in its vicinity. The RF tags use this indication to group themselves into k rounds. See description of FIG. 5 below.

The reading process proceeds in rounds, and the reader station uses a counter, i, to keep track of the rounds. This counter is set to an initial value of 1 (420). In each round, the reader station sends a wake-up signal and an indication of the sequence number (value of i) of the round (430). It then proceeds to identify all RF tags that have grouped themselves into round i. This identification uses one of the methods described in reference [1] that minimizes the length of the reading process for the the round (450). The information about the identities of the tags acquired in each round is stored in the memory of the reading station. At the end of the round, the reading station increments the counter i (460) and checks whether there are any further rounds remaining (470). This procedure terminates at the end of the k-th round (480), at which time the reader station has acquired the identities of all the RF tags in its range.

Figure 5:
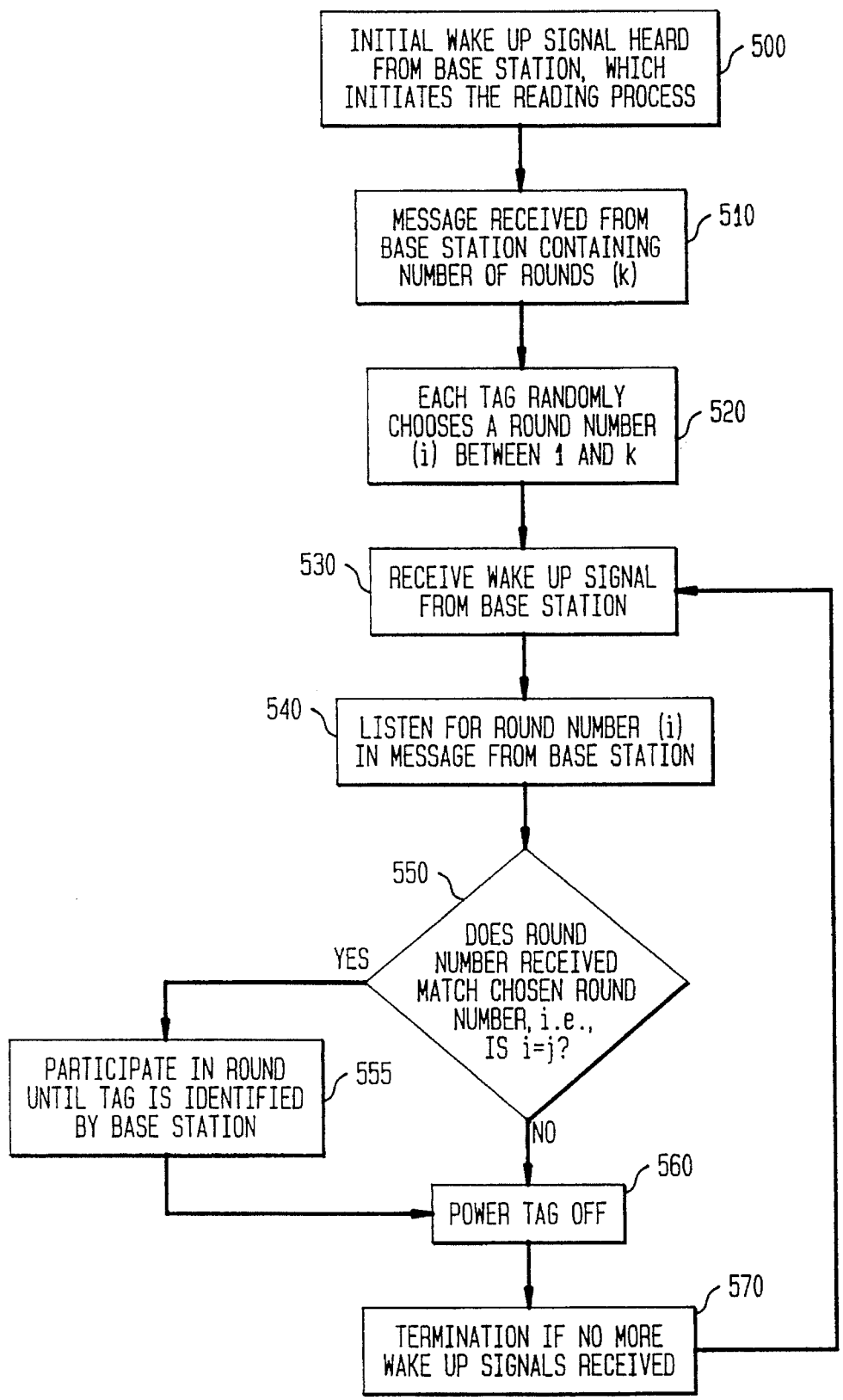
FIG. 5 is a block diagram for the single frequency procedure used by the RF tag.

FIG. 5 is a block diagram for the single frequency procedure used by the RF tag. The RF tag (T) is in a quiescent (deactivated) state when it receives the initial wakeup signal from the reader station. Upon receiving the initial wakeup signal (500), T enters an active state. It uses the indication k in an initial message (510) and computes a round number (j), where j is a random integer in the range $1, 2, \ldots, k$. The random integer j is then stored in its memory (520). This number j is the sequence number of the round in which T will participate. T then powers itself off. Subsequently, T receives a second wakeup signal (530) and a second indication i (540) of the round number. It compares the round sequence number i with its stored round number j (550). If the numbers i and j match, T participates in the tag identification procedure (555), see reference [1], otherwise, T powers itself off (560). Once T is identified in round j, it stores an IDENTIFIED indication in its memory and does not participate any further in the identification process (570).

Figure 6:
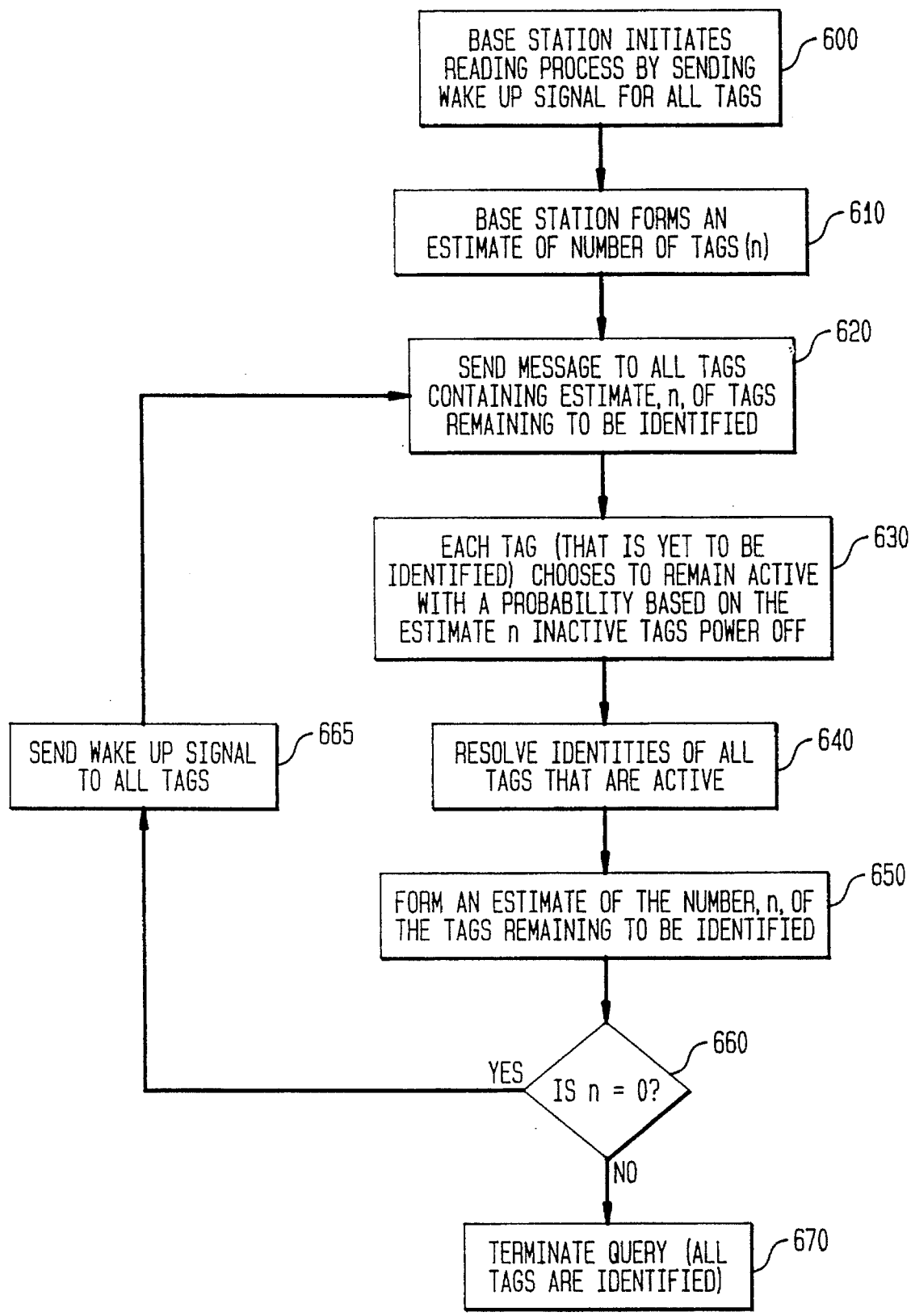
FIG. 6 is a block diagram for an alternative single frequency procedure of RF tag identification used by the RF reader station.

FIG. 6 shows an alternative single frequency procedure of RF tag identification that may be used by the RF reader station. The reader station initiates the identification process (600) by sending a wake-up signal to all the tags in its range. This wake-up signal may be in the form of a short pulse of high intensity on a predetermined frequency. The reader station computes a first estimate, n, (610) of the number of tags present in its range (listening area). This estimate may be derived using a technique such as the one presented in reference [2], or it may be based on human input. The reader station sends a message to all tags containing this estimate, n (620). Upon receiving this message, each tag chooses to remain active with a probability based on the estimate n (630). This probability is so devised to ensure that a small number of tags remain active. For example, with p defined as before, the probability that a given tag remains activated can be computed as $\sqrt{p/n}$ when n is large, say n>10. For smaller n, all the tags remain activated. Inactive tags power off. The reader station now identifies all the active tags (640) using one of the methods described in the prior art or in reference [1] The objective of these said methods is to minimize the length of the identification process for the active tags.

Once this identification process is complete, the reading station forms a new estimate, n, of the number of tags remaining to be identified (650). If this estimate is zero, the reading station verifies that all tags have been identified by querying the tags (660). For example, one way of verifying that all tags have been identified is for the reader to transmit a query asking all unidentified tags to transmit back. If none of the tags transmit a message, the reader can then verify that all tags have indeed been identified. Otherwise, it sends a new wake-up signal (665) to all the tags, followed by a message containing the new estimate, n, of tags remaining to be identified (620). This process continues until all tags have been successfully identified (670).

Figure 7:
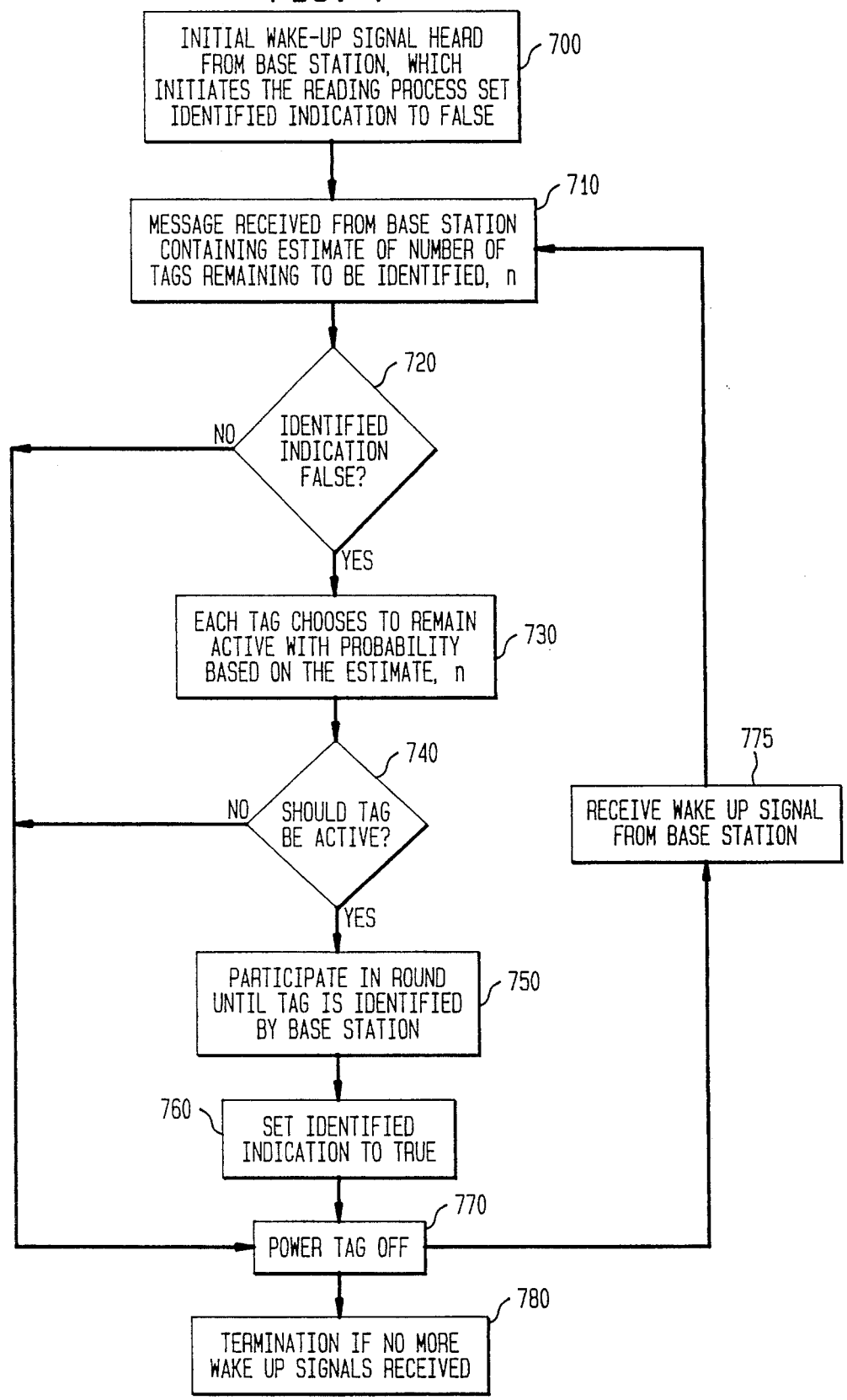
FIG. 7 is a block diagram for an alternative single frequency procedure used by the RF tag.

FIG. 7 shows a block diagram for the procedure used by the RF tag in conjunction with the alternative single frequency procedure described above for FIG. 6. The RF tag (T) is in a quiescent (deactivated) state when it receives the initial wakeup signal from the reader station. The wakeup signal is followed by a message indicating that it is the initial wakeup signal of a series of signals that will be sent from the reader station. Upon receiving the initial wakeup signal (700), T enters an active state. It initializes an IDENTIFIED indication stored in the tag memory to FALSE.

After every wake-up signal, T receives a message containing, n, the estimate of the number of tags to be identified (710). In response to this message, the tag T checks its IDENTIFIED indication to see whether it has been previously identified (720). If so, it powers itself off (770). Otherwise, each tag chooses to remain active with a probability based on the estimate n (730). As explained above, with p defined as before, the probability that a given tag remains activated can be chosen as $\sqrt{p/n}$ when n is large, say n>10. For smaller n, all the tags remain activated. Tags which choose not to remain active (740) power themselves off (770). The remaining active tags participate in the identification process with the reader station (750). Once a tag T is identified, it sets its IDENTIFIED indication to TRUE (760) and powers itself off. The tag remains in the powered off state until it receives a subsequent wake-up message from the reader station (775). This process continues until all tags have been successfully identified (780).

Figure 8:
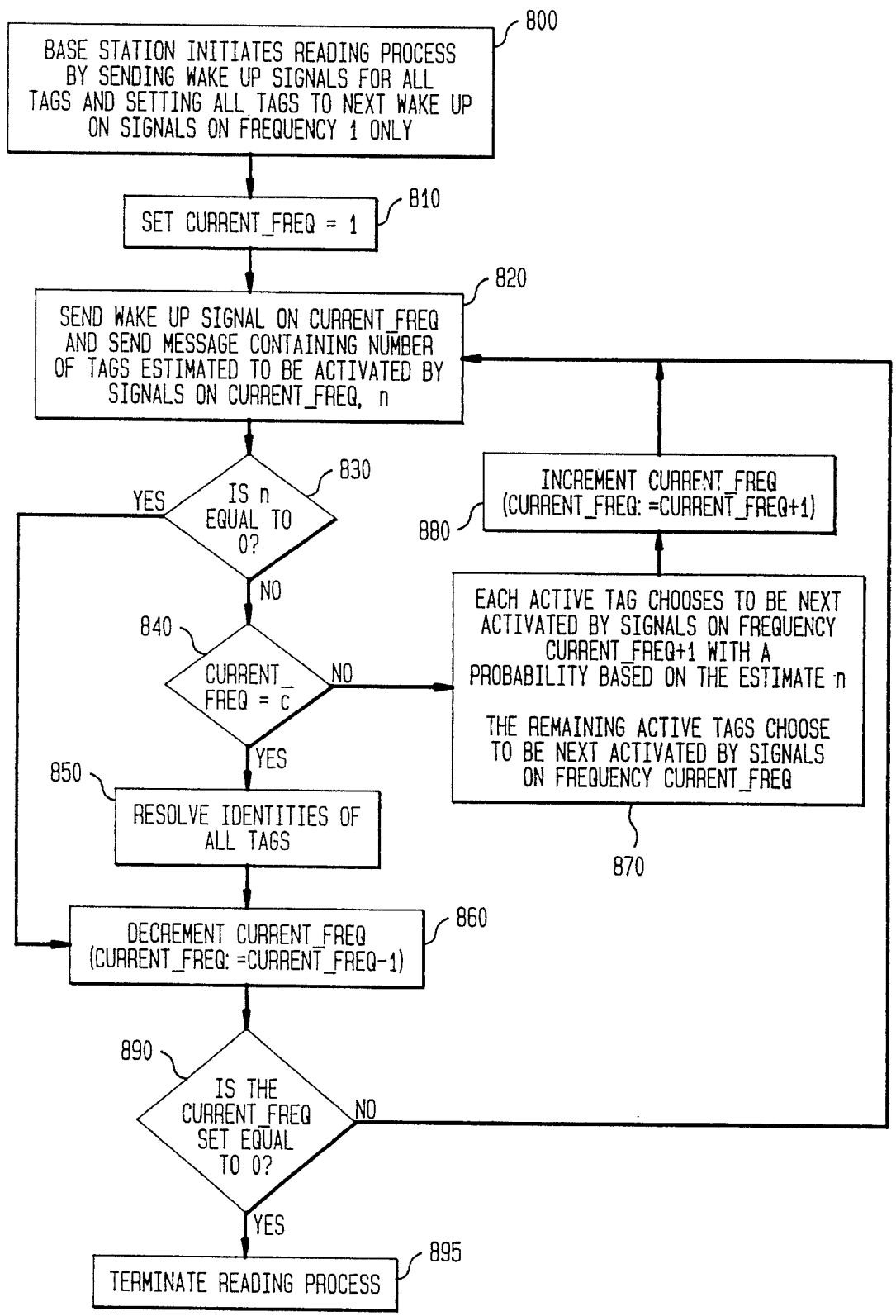
FIG. 8 is a block diagram for the multiple frequency procedure of RF-tag identification used by the RF reader station.

FIG. 8 is a block diagram for the multiple frequency procedure of RF tag identification used by the RF reader station. As before, we have a tag identification system having only a single two-way communications channel between a reader and a plurality of tags in the range of the reader, where the identification of the tags is not initially known to the reader. In addition, the reader can send signals on a plurality of frequencies. We label these frequencies with the indices 1,2, . . . , c where the index 1 represents the first frequency and the index c represents the last frequency. The tags have the capability of being activated only in response to a signal on a predetermined frequency with the tags remaining deactivated in the presence of signals from the reader station on frequencies other than the predetermined frequency, each active tag further having the capability of selecting the frequency on which it will next be activated, and where each tag can deactivate itself. The reader station initiates the identification process (800) by sending a wake-up signal to all the tags in its range. The tags are configured by this signal to only respond to signals on the first frequency. The reader keeps an indicator labeled CURRENT_FREQ which is set to the frequency index on which the reader will be sending out query messages. Initially, the CURRENT_FREQ indicator is set to the first frequency index (810). The reader station computes the number of tags, n, that are likely to be activated by signals on CURRENT_FREQ and that are yet to be identified. A wake-up signal is sent on CURRENT_FREQ and then a message containing the estimate n is sent to the activated tags (820). Initially, this estimate may be provided by an external source (such as the human operator of the system) or it may be derived using a technique such as the one presented in [2]. Later on, this can be computed as the number of tags estimated to be activated by the wakeup signal.

If the estimate n is zero, the reading station verifies that all tags have been identified by querying the tags. As described before, one way of verifying that all active tags have been identified is for the reader to transmit a query asking all unidentified tags to transmit back. If none of the tags transmit a message, the reader can then verify that all tags have indeed been identified. If estimate n is verified to be zero (830), the CURRENT_FREQ indicator is decremented (860). If the CURRENT_FREQ indicator is now set to zero (890), the reading process is terminated (895). Otherwise, if the CURRENT_FREQ indicator is not set to zero, a wake-up signal is sent on the frequency indicated by the CURRENT_FREQ indicator together with an estimate of the tags likely to be activated (820).

If the estimate n was not zero (830), the reading station verifies that the CURRENT_FREQ was not set to c, the last frequency (840). If the CURRENT_FREQ was indeed set to c then all the activated tags are identified by a method similar to those described above for tags that can only respond to signals on a single frequency (850). Only signals on the last frequency, indexed by c, are used for this process. The information about the identities of the tags acquired in each round is stored in the memory of the reading station. When this process is completed, the CURRENT_FREQ indicator is decremented (860). If the CURRENT_FREQ indicator is set to zero (890), the reading process is terminated (895). Otherwise, a wake-up signal is sent on the frequency indicated by the CURRENT_FREQ indicator together with an estimate of the tags likely to be activated (820). If the CURRENT_FREQ was not set to c at (840), then the activated tags are divided into two groups. One group of tags selects to be next activated by signals on the CURRENT_FREQ and the other group of tags will be next activated by signals on CURRENT_FREQ+1 (870). The group selection is done with the goal of ensuring that a small number of tags will finally be left activated in response to signals on the last frequency, c. As before, let a unit of power be consumed at the tag for a unit of time, the unit of time being the time that it takes for the reader station to send a message or the time it takes for the tag to send a message containing its identity. For example, the group selection can be done on the basis of three quantities: (i) the estimated number of tags, n, that were activated (and yet to be identified), (ii) the minimum power consumption, p, if a tag is activated and it chooses to deactivate itself, and (iii) the CURRENT_FREQ indicator, denoted by f. When n is larger than a predetermined threshold, for example 10, our goal is for the size of the second group of tags that select to be activated in response to signals on frequency f+1 to be given by $n^{(c-f+1)/(c-f+2)} p^{1/(c-f+2)}$. This can be achieved by each activated tag choosing randomly to be in this second group with probability $n^{-1/(c-f+2)} p^{1/(c-f+2)}$. When n is below the predetermined threshold, all the active tags are in the second group that will be activated in response to signals on frequency f+1. At the end of this group selection, the CURRENT_FREQ indicator is incremented (880) and a wake-up signal is sent on the frequency indicated by the CURRENT_FREQ indicator together with an estimate of the tags likely to be activated (820).

Figure 9:
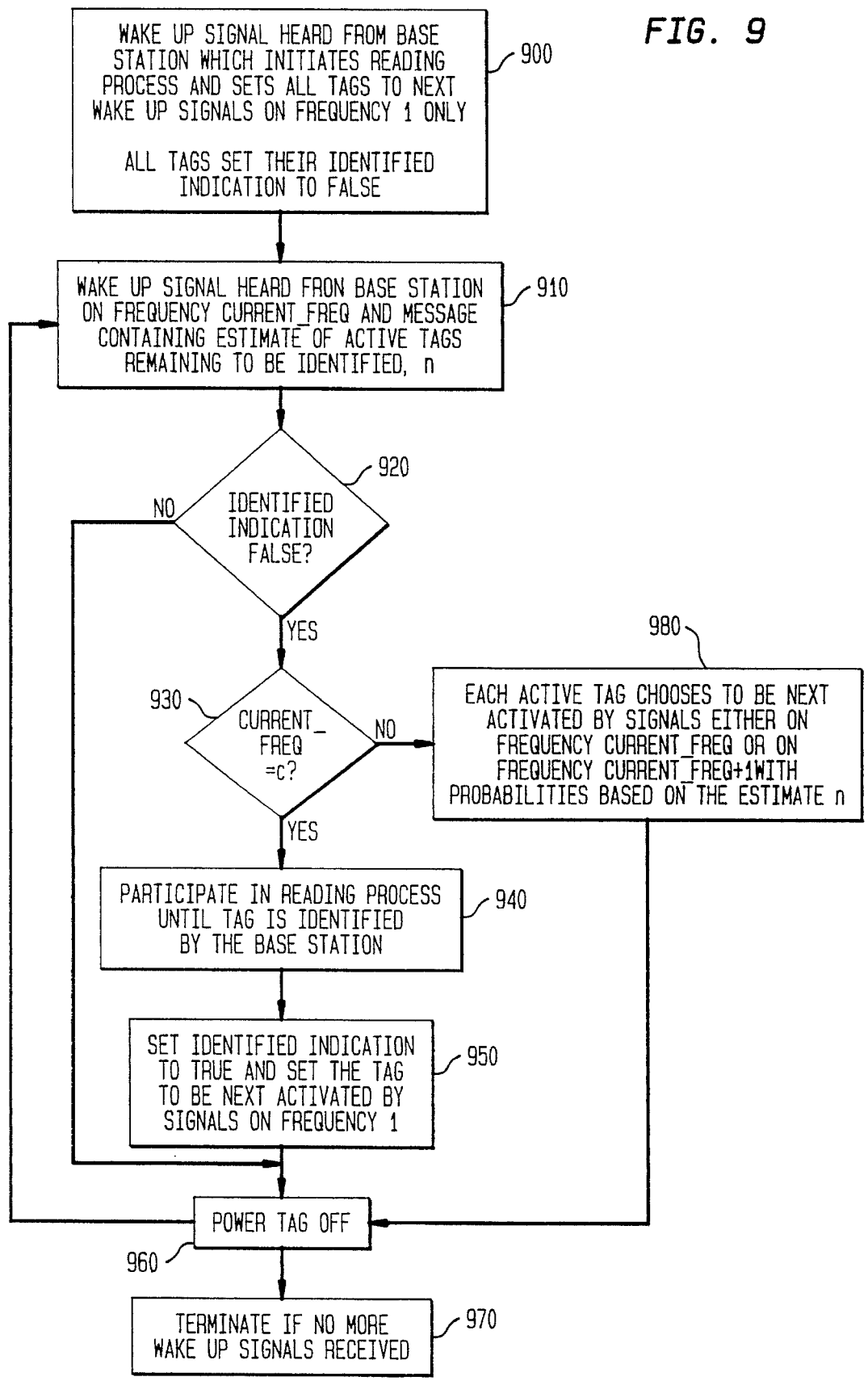
FIG. 9 is a block diagram for the multiple frequency procedure used by the RF tag.

FIG. 9 is a block diagram for the multiple frequency procedure used by the RF tag in conjunction with the signals on multiple frequencies procedure described above. The RF tag (T) is in a quiescent (deactivated) state when it receives the initial wakeup signal from the reader station (900). Upon receiving the initial wakeup signal (900), T enters an active state. It initializes an IDENTIFIED indication stored in the tag memory to FALSE. Further, the tag sets itself to next respond to signals on the first frequency only.

On the next wake-up signal heard by the tag, T receives a message containing n, the estimate of the number of tags that were activated in response to that signal and have yet to be identified (910). In response to this message, the tag T checks its IDENTIFIED indication to see whether it has been previously identified (920). If so, it powers itself off (960). Otherwise, the tag checks to see if the wakeup signal was heard on the last frequency c (930). If so, T participates in the reading process until it is identified (940). As described above, this reading process is similar to the reading process for the case where tags respond only to signals on a single frequency. Further, the reading process uses signals on the last frequency c only. After being identified, the tag sets its IDENTIFIED indication to TRUE and sets itself to next respond to signals on the first frequency only (950), and then powers off (960). If the wakeup signal was not heard on the last frequency c (930), then the activated tags divide into two groups as described above in the explanation associated with (870). Let the frequency on which the last wakeup signal was heard be denoted by CURRENT_FREQ. One group of tags selects to be next activated by signals on CURRENT_FREQ and the other group of tags will be next activated by signals on CURRENT_FREQ+1 (980). The group selection is done with the goal of ensuring that a small number of tags will finally be left activated in response to signals on the last frequency, c. As before, let a unit of power be consumed at the tag for a unit of time, the unit of time being the time that it takes for the reader station to send a message or the time it takes for the tag to send a message containing its identity. For example, the group selection can be done on the basis of three quantities: (i) the estimated number of tags, n, that were activated (and yet to be identified), (ii) the minimum power consumption, p, if a tag is activated and it chooses to deactivate itself, and (iii) the CURRENT_FREQ indicator, denoted by f. When n is larger than a predetermined threshold, for example 10, our goal is for the size of the second group of tags that select to be activated in response to signals on frequency f+1 to be given by $n^{(c-f+1)/(c-f+2)}p^{1/(c-f+2)}$. This can be achieved by each activated tag choosing randomly to be in this second group with probability $n^{-1/(c-f+2)}p^{1/(c-f+2)}$. When n is below the predetermined threshold, all the active tags are in the second group that will be activated in response to signals on frequency f+1. At the end of this group selection, the tags power off (960). The tag remains in the powered off state until it receives a subsequent wake-up message from the reader station (910). This process continues until all tags have been successfully identified (970).

Figure 10:
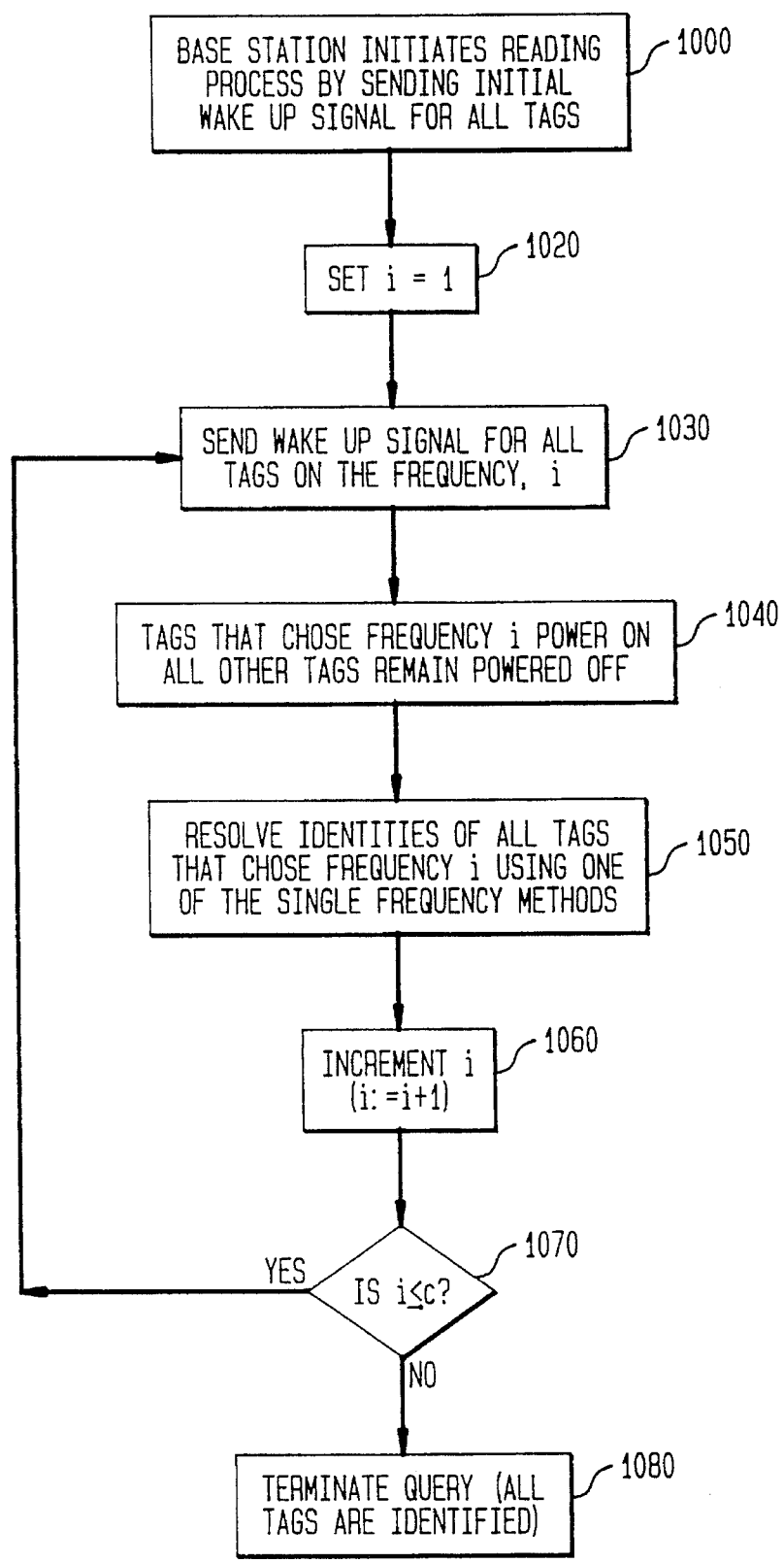
FIG. 10 is a block diagram for an alternative multiple frequency procedure of RF-tag identification used by the RF reader station.

FIG. 10 is a block diagram for an alternative procedure of RF tag identification used by the RF reader station, when the reader can send signals on a plurality of frequencies. As before, we have a tag identification system having only a single two-way communications channel between a reader and a plurality of tags in the range of the reader, where the identification of the tags is not initially known to the reader. In addition, the reader can send signals on a plurality of frequencies. We label these frequencies with the indices 1,2, ..., c where the index 1 represents the first frequency and the index c represents the last frequency. The tags have the capability of being activated only in response to a signal on a predetermined frequency with the tags remaining deactivated in the presence of signals from the reader station on frequencies other than the predetermined frequency. Further, each active tag has the capability of selecting the frequency on which it will next be activated, and each tag can deactivate itself. The reader station initiates the identification process (1000) by sending a wake-up signal to all the tags in its range. The number of frequencies on which signals may be sent, c, is known to the tags and the reader.

The RF tags respond to the initial wake-up signal by grouping themselves into c rounds (see description of FIG. 11 below). The reading process proceeds in rounds, and the reader station uses a counter, i, to keep track of the rounds. This counter is set to an initial value of 1 (1020). In each round, the reader station sends a wake-up signal on the frequency i (1030). This activates all tags that had chosen to be identified by signals on frequency i (1040). The reader station then proceeds to identify all the active RF tags (1050) by a method similar to those described above for tags that can only respond to signals on a single frequency. Only signals on the frequency i are used for this process. The information about the identities of the tags acquired in each round is stored in the memory of the reading station. At the end of this reading round, the reading station increments the counter i (1060) and checks whether there are any further frequencies remaining (1070). This procedure terminates at the end of the c-th round (1080), at which time the reader station has acquired the identities of all the RF tags in its range.

Figure 11:
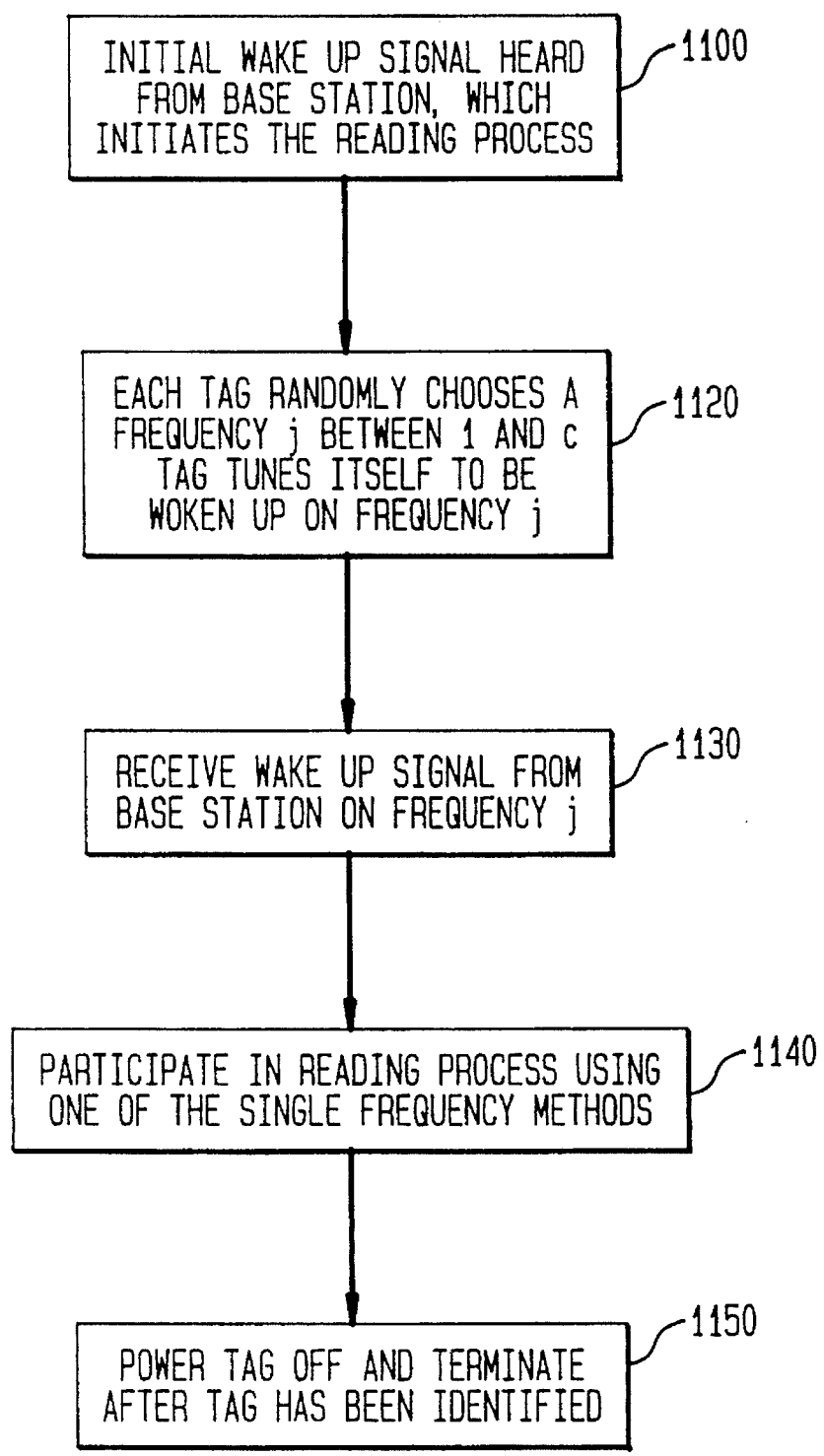
FIG. 11 is a block diagram for an alternative multiple frequency procedure used by the RF tag.

FIG. 11 is a block diagram for the multiple frequency procedure used by the RF tag in conjunction with the signals on multiple frequencies procedure described above, associated with FIG. 10. The RF tag (T) is in a quiescent (deactivated) state when it receives the initial wakeup signal From the reader station. Upon receiving the initial wakeup signal (1100), T enters an active state. It then computes a frequency round number (j), where j is a random integer in the range 1, 2, . . . , c and is stored in its memory (1120). This number j is the frequency of the wakeup signal to which the tag will next respond. T then powers itself off. Subsequently, T receives a wakeup signal (1130) on frequency j. T participates in the reading process until it is identified (1140). As described above, this reading process is similar to the reading process for the case where tags respond only to signals on a single frequency. Further, the reading process uses signals on the frequency j only. Once T is identified, it stores an IDENTIFIED indication in its memory and does not participate any further in the identification process (1150).

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

References

1. U.S. patent application Ser. No. 304,340, entitled, MULTIPLE ITEM RADIO FREQUENCY TAG IDENTIFICATION PROTOCOL, filed Sep. 12, 1994, and assigned to the assignee as the current application.
2. I. Cidon and M. Sidi, IEEE Transaction Information Theory, vol. 34, no. 1., pp. 101–110, January 1988.

Having thus described our invention, what we claim as new and desire to secure by Letters Patents is:

1. In a tag identification system having only a single two-way communications channel between a reader and a plurality of tags in the range of the reader, where the identification of the tags is not initially known to the reader, where the tags can be activated by the reader in response to signals on a single frequency, and where each tag can deactivate itself, a method of identifying all of the tags in the range of the reader, the method comprising:

a. broadcasting a first signal and a first query message from the reader, the first signal being used to activate all of the tags, and the first query message containing a first indication of the number of the tags in the range of the reader station;

b. each of the tags storing an IDENTIFIED indication that it is not yet identified by the reader in its non-volatile memory, in response to the first query message;

c. each of the tags performing a corresponding computation based upon the first indication, random bits at each tag, and the stored IDENTIFIED indication in response to the first query message received, with each of the tags deactivating itself if its corresponding computation yields a corresponding, predetermined result, thereby forming a first set of remaining, activated tags;

d. identifying each tag of the first set of the activated tags, with each tag of the first set changing its stored IDENTIFIED indication to indicate its successful identification by the reader in said each tag's non-volatile memory, with each tag deactivating itself after said successful identification;

e. broadcasting a second signal and a second query message from the reader, the second signal activating all tags in the range of the reader, and the second query message containing a second indication of the number of unidentified tags in the range of the reader;

f. repeating steps c) and d) using the second indication instead of the first indication, thereby creating a second set of remaining activated tags for step d), and thereby increasing the number of tags which have been identified; and g. repeating steps e) and f) using subsequent signals and query messages with subsequent indications until all of the tags in the range of the reader have been identified.

2. A tag identification system having only a single two-way communications channel between a reader and a plurality of tags in the range of the reader, where the identification of the tags is not initially known to the reader, where the tags can be activated by the reader in response to signals on a single frequency, and where each tag can deactivate itself, a method of identifying all of the tags in the range of the reader, said system comprising:

a. means for broadcasting a first signal and a first query message from the reader, the first signal being used to activate all of the tags, and the first query message containing a first indication of the number of the tags in the range of the reader station;

b. means for each of the tags to store an IDENTIFIED indication that it is not yet identified by the reader in its non-volatile memory, in response to the first query message;

c. means for each of the tags to perform a corresponding computation based upon the first indication, random bits at each tag, and the stored IDENTIFIED indication in response to the first query message received, with each of the tags deactivating itself if its corresponding computation yields a corresponding, predetermined result, thereby forming a first set of remaining, activated tags;

d. means for identifying each tag of the first set of the activated tags, with each tag of the first set changing its stored IDENTIFIED indication to indicate its successful identification by the reader in said each tag's non-volatile memory, with each tag deactivating itself after said successful identification;

e. means for broadcasting a second signal and a second query message from the reader, the second signal activating all tags in the range of the reader, and the second query message containing a second indication of the number of unidentified tags in the range of the reader;

f. means for repeating steps c) and d) using the second indication instead of the first indication, thereby creating a second set of remaining activated tags for step d), and thereby increasing the number of tags which have been identified; and g. means for repeating steps e) and f) using subsequent signals and query messages with subsequent indications until all of the tags in the range of the reader lave been identified.

3. In a tag identification system having only a single two-way communications channel between a reader and a plurality of tags in the range of the reader, where the identification of the tags is not initially known to the reader, where the tags can be activated by the reader in response to signals on a single frequency and where each tag can deactivate itself, a method of identifying all of the tags in the range of the reader, the method comprising:

a. broadcasting a first signal and a first query message from the reader, the first signal being used to activate all of the tags, and the first query message containing a first indication of the number of the tags in the range, and a QUERY-ROUND indication that it is the first query message;

b. each of the tags performing a corresponding computation based upon the first indication and random bits at each tag, and storing the corresponding result, referred to as a ROUND indication, in said each tags own non-volatile memory in response to the first query message received;

c. each of the tags deactivating itself if its ROUND indication does not match the QUERY-ROUND indication, thereby forming a first set of remaining activated tags;

d. identifying each tag of the first set of the activated tags, with each tag of the first set deactivating itself after it has been identified by the reader;

e. broadcasting a second signal and a second query message from the reader, the second signal activating all tags in the range of the reader, and the second query message containing a second QUERY-ROUND indication;

f. repeating steps c) and d) using the second QUERY-ROUND indication instead of the QUERY-ROUND indication, thereby creating a second set of tags for step d; and g. repeating steps e) and f) using subsequent signals and query messages with subsequent QUERY-ROUND indications until all of the tags in the range of the reader have been identified.

4. In a tag identification system having only a single two-way communications channel between a reader and a plurality of tags in the range of the reader, where the identification of the tags is not initially known to the reader, where the tags can be activated by the reader in response to signals on a single frequency and where each tag can deactivate itself, a method of identifying all of the tags in the range of the reader, the method comprising:

a. means for broadcasting a first signal and a first query message from the reader, the first signal being used to activate all of the tags, and the first query message containing a first indication of the number of the tags in the range, and a QUERY-ROUND indication that it is the first query message;

b. means for each of the tags to perform a corresponding computation based upon the first indication and random bits at each tag, and storing the corresponding result, referred to as a ROUND indication, in said each tags own non-volatile memory in response to the first query message received;

c. means for each of the tags to deactivate itself if its ROUND indication does not match the QUERY-ROUND indication, thereby forming a first set of remaining activated tags;

d. means for identifying each tag of the first set of the activated tags, with each tag of the first set deactivating itself after it has been identified by the reader;

e. means for broadcasting a second signal and a second query message from the reader, the second signal activating all tags in the range of the reader, and the second query message containing a second QUERY-ROUND indication;

f. means for repeating steps c) and d) using the second QUERY-ROUND indication instead of the QUERY-ROUND indication, thereby creating a second set of tags for step d; and g. means for repeating steps e) and f) using subsequent signals and query messages with subsequent QUERY-ROUND indications until all of the tags in the range of the reader have been identified.

5. In a tag identification system having only a single two-way communications channel between a reader and a plurality of tags in the range of the reader, where the identification of the tags is not initially known to the reader, where the reader can send signals on a plurality of frequencies indexed as 1, 2, . . . , c, where tags have the capability of being activated only in response to a signal on a predetermined one of the plurality of frequencies with the tags remaining deactivated in the presence of signals from the reader station on frequencies other than the predetermined one frequency, each active tag further having the capability of selecting the frequency on which it will next be activated, and where each tag can deactivate itself, a method of identifying all of the tags in the range of the reader, the method comprising:

a. initializing a reading process by setting all the tags to respond to signals of frequency 1 only, by setting each of the tags to indicate that they haven't been identified, and by setting a CURRENT_FREQUENCY indicator in the reader to frequency 1;

b. broadcasting from the reader a first signal on one of said frequencies indicated by the CURRENT_FREQUENCY and broadcasting a first query message, the first signal being used to activate all of the tags which respond to signals on the frequency indicated by the CURRENT_FREQUENCY indicator, and the first query message containing a tag estimate indication of the number of the tags in the range of the reader that will be activated in response to the first signal;

c. the reader station decrementing its CURRENT_FREQUENCY indicator if it estimates that no tags will be activated in response to the first signal on the frequency indicated by the CURRENT_FREQUENCY indicator;

d. identifying all active tags if the CURRENT_FREQUENCY indicator is set to the final frequency c, with signals on only the final frequency c being used to identify the active tags, with each of the latter active tags changing its stored IDENTIFIED indication to reflect its successful identification by the reader in said each tags non-volatile memory, and the identified tags configuring themselves to be activated only in response to signals on the first frequency, and each tag deactivating itself after said successful identification, the reader station decrementing its CURRENT_FREQUENCY indicator at the end of the identification of all the latter active tags;

e. if the CURRENT_FREQUENCY was not the final frequency c, each of the active tags performing a corresponding computation based upon the tag estimate indication, random bits at each tag, and the stored IDENTIFIED indication in response to the first query message received, with each of the tags deactivating itself if its corresponding computation yields a corresponding predetermined result, and said deactivated tags configuring themselves to be activated only in response to signals on the same frequency on which they were activated, the remaining tags other than said deactivated tags configuring themselves to be activated in response to signals on a subsequent frequency instead of the frequency on which they were last activated, the reader station incrementing its CURRENT_FREQUENCY indicator, and f. repeating steps b) through e) until the CURRENT_FREQUENCY indicator is set to zero, at which time all of the tags have been identified.

6. In a tag identification system having only a single two-way communications channel between a reader and a plurality of tags in the range of the reader, where the identification of the tags is not initially known to the reader, where the reader can send signals on a plurality of frequencies indexed as 1, 2, . . . , c, where tags have the capability of being activated only in response to a signal on a predetermined one of the plurality of frequencies with the tags remaining deactivated in the presence of signals from the reader station on frequencies other than the predetermined one frequency, each active tag further having the capability of selecting the frequency on which it will next be activated, and where each tag can deactivate itself, a method of identifying all of the tags in the range of the reader, the method comprising:

a. means for initializing a reading process by setting all the tags to respond to signals of frequency 1 only, by setting each of the tags to indicate that they haven't been identified, and by setting a CURRENT_FREQUENCY indicator in the reader to frequency 1;

b. means for broadcasting from the reader a first signal on one of said frequencies indicated by the CURRENT_FREQUENCY and broadcasting a first query message, the first signal being used to activate all of the tags which respond to signals on the frequency indicated by the CURRENT_FREQUENCY indicator, and the first query message containing a tag estimate indication of the number of the tags in the range of the reader that will be activated in response to the first signal;

c. means for the reader station to decrement its CURRENT_FREQUENCY indicator if it estimates that no tags will be activated in response to the first signal on the frequency indicated by the CURRENT_FREQUENCY indicator;

d. means for identifying all active tags if the CURRENT_FREQUENCY indicator is set to the final frequency c, with signals on only the final frequency c being used to identify the active tags, with each of the latter active tags changing its stored IDENTIFIED indication to reflect its successful identification by the reader in said each tags non-volatile memory, and the identified tags configuring themselves to be activated only in response to signals on the first frequency, and each tag deactivating itself after said successful identification, the reader station decrementing its CURRENT_FREQUENCY indicator at the end of the identification of all the latter active tags;

e. means for, if the CURRENT_FREQUENCY was not the final frequency c, each of the active tags to perform a corresponding computation based upon the tag estimate indication, random bits at each tag, and the stored IDENTIFIED indication in response to the first query message received, with each of the tags deactivating itself if its corresponding computation yields a corresponding predetermined result, and said deactivated tags configuring themselves to be activated only in response to signals on the same frequency on which they were activated, the remaining tags other than said deactivated tags configuring themselves to be activated in response to signals on a subsequent frequency instead of the frequency on which they were last activated, the reader station incrementing its CURRENT_FREQUENCY indicator; and f. means for repeating steps b) through e) until the CURRENT_FREQUENCY indicator is set to zero, at which time all of the tags have been identified.

7. In a tag identification system having only a single two-way communications channel between a reader and a plurality of tags in the range of the reader, where the identification of the tags is not initially known to the reader, where the reader can send signals on a plurality of frequencies indexed as 1, 2, . . . , c, where tags have the capability of being activated only in response to a signal on a predetermined one of the plurality of frequencies with the tags remaining deactivated in the presence of signals from the reader station on frequencies other than the predetermined one frequency, each active tag further having the capability of selecting the frequency on which it will next be activated, and where each tag can deactivate itself, a method of identifying all of the tags in the range of the reader, the method comprising:

a. broadcasting a first signal and a first query message, the first signal being used to activate all of the tags, and setting a CURRENT_FREQUENCY indicator in the reader to frequency 1;

b. each of the tags performing a corresponding computation based upon the first query message and random bits at each tag, and each tag configuring itself to respond to only one of said plurality of frequencies based upon said computation, and then each tag deactivating itself;

c. broadcasting a wake up signal on a frequency indicated by the CURRENT_FREQUENCY indicator at the reader, where said wake up signal activates all tags configured to be activated in response to signals on said frequency;

d. identifying all active tags of step c) using signals on only said frequency, with each tag deactivating itself after successful identification, the reader station incrementing its CURRENT_FREQUENCY indicator at the end of the identification of all latter active tags; and e. repeating steps c) and d) for each frequency indicated by the CURRENT_FREQUENCY indicator until the current frequency indicator is set to frequency c+1.

8. In a tag identification system having only a single two-way communications channel between a reader and a plurality of tags in the range of the reader, where the identification of the tags is not initially known to the reader, where the reader can send signals on a plurality of frequencies indexed as 1, 2, . . . , c, where tags have the capability of being activated only in response to a signal on a predetermined one of the plurality of frequencies with the tags remaining deactivated in the presence of signals from the reader station on frequencies other than the predetermined one frequency, each active tag further having the capability of selecting the frequency on which it will next be activated, and where each tag can deactivate itself, a method of identifying all of the tags in the range of the reader, the method comprising:

a. means for broadcasting a first signal and a first query message, the first signal being used to activate all of the tags, and setting a CURRENT_FREQUENCY indicator in the reader to frequency 1;

b. means for each of the tags to perform a corresponding computation based upon the first query message and random bits at each tag, and each tag configuring itself to respond to only one of said plurality of frequencies based upon said computation, and then each tag deactivating itself;

c. means for broadcasting a wake up signal on a frequency indicated by the CURRENT_FREQUENCY indicator at the reader, where said wake up signal activates all tags configured to be activated in response to signals on said frequency;

d. means for identifying all active tags of step c) using signals on only said frequency, with each tag deactivating itself after successful identification, the reader station incrementing its CURRENT_FREQUENCY indicator at the end of the identification of all latter active tags; and e. means for repeating steps c) and d) for each frequency indicated by the CURRENT_FREQUENCY indicator until the current frequency indicator is set to frequency c+1.

* * * * *